United States Patent Office 3,507,811
Patented Apr. 21, 1970

3,507,811
CATALYST FOR THE REACTION OF
HYDROCARBONS WITH STEAM
Phineas Davies and Isaac James Green, Norton-on-Tees,
England, assignors to Imperial Chemical Industries
Limited, London, England, a corporation of Great
Britain
No Drawing. Filed Feb. 27, 1967, Ser. No. 619,033
Claims priority, application Great Britain, Mar. 14, 1966,
11,073/66
Int. Cl. B01j 11/06, 11/40; C01b 2/18
U.S. Cl. 252—455
14 Claims

ABSTRACT OF THE DISCLOSURE

A catalyst for the reaction of hydrocarbons with steam, carbon dioxide, oxygen or mixtures thereof and comprising a metal catalytically active in that reaction, refractory metal oxide support material and optionally a hydraulic cement, exhibits a high degree of mechanical strength yet at the same time high activity, if the said support material has been introduced during the preparation of the catalyst partly as such and partly by precipitation with a compound of the said active metal. The catalyst is especially suitable for use in the oxidative secondary reforming process.

---

This invention relates to a catalyst for the reaction of hydrocarbons with steam, carbon dioxide or oxygen, to a method of making it and to a process using it, especially under secondary reforming conditions.

According to the invention there is provided a catalyst for the reaction of hydrocarbons with steam, carbon dioxide or oxygen or mixtures thereof which comprises a metal catalytically active in that reaction, a refractory metal oxide support material and optionally a hydraulic cement, the refractory metal oxide support material having been introduced during the preparation of the catalyst partly as such and partly by coprecipitation with a compound of the active metal.

By "as such" is meant in the form of a solid of low solubility so that its physical structure is neither formed nor destroyed during the making of the catalyst.

The invention provides also precursor compositions convertible by simple treatment to this catalyst. Most conveniently these compositions contain the active metal in the form of its oxide and are convertible to the active catalyst by reduction.

In catalysts according to the invention the refractory metal oxide support material preferably comprises two or more metal oxide components capable of interacting to form a thermally stable mixed oxide. It is within the invention to have each such component added partly as such and partly by coprecipitation, and also, more conveniently, to have several such components added as such and one or part of the content of one added by coprecipitation.

The invention provides also a method of making such a catalyst or composition which comprises precipitating together a compound of a metal catalytically active in that reaction and a compound of at least one further metal whose oxide is usable as a refractory catalyst support material, adding before, during or after the coprecipitation a quantity of a substantially water-insoluble compound of a metal whose oxide is usable as a refractory catalyst support material, removing any undesired soluble substances from the resulting mixture, and shaping the mixture, optionally with the addition of hydraulic cement.

The method can include other steps such as calcination to convert the precipitated compounds to oxides. After shaping the mixture the product is a precursor composition as mentioned above, and is in a condition suitable for marketing and transporting. It requires reduction to give the active catalyst, an operation usually carried out by the user of the catalyst in the reactor in which it is to be used.

In the method according to the invention the presence in the refractory metal oxide support material of the two or more components capable of interacting to form a thermally stable mixed oxide is conveniently provided for by adding several such components as substantially water-insoluble compounds and one or part of the content of one by coprecipitation.

Although related catalysts and catalyst-making methods have been described before, for example in which the catalytically active metal and support material have been coprecipitated and then made up with hydraulic cement, the catalysts produced by those methods have not shown the very high mechanical stability under severe reaction conditions which catalysts according to this invention, especially in preferred forms, have shown. In addition, catalysts according to this invention are of high activity, a property which it has been somewhat difficult to obtain at the same time as high mechanical strength.

Thermally stable mixed oxides usable as catalyst supports usually consist of a basic component, for example an alkaline earth metal oxide, and a relatively acidic component, for example an oxide of aluminium, chromium, titanium or zirconium. Among such mixed oxides some have hydraulic properties and are usable as the constituents of hydraulic cements, and combinations of such oxides are preferred as the supports of catalysts according to the invention. In hydraulic cement technology the basic component is referred to as the "calcareous component" and the relatively acidic component as the "argillaceous component." The main examples of calcareous components are the oxides of calcium, strontium and barium; and the main examples of argillaceous components are aluminium, silicon, chromium and iron, and these are often encountered as mixtures, for example of all four in chrome cements, and of aluminium, silicon and iron in Portland cement or in aluminous cements of moderately low silica content. It will be appreciated that since silicon is not a metal, silica is not considered as part of the refractory metal oxide support material of the catalyst according to the invention, although it may be present as an incidental ingredient. Likewise iron oxide, being readily reducible, is not considered as part of the refractory metal oxide support material.

In carrying out the coprecipitation the catalytically active metal and support metal are introduced as a water soluble salt preferably having a cation such as nitrate or acetate which does not poison the eventual catalyst or give rise to catalyst-poisons. The precipitant is most conveniently an alkali metal carbonate or bicarbonate, but others can be used, for example, the alkali metal and ammonium hydroxides and ammonium carbonate or bicarbonate, or oxalates.

The further metal, a compound of which is introduced by coprecipitation, is preferably one whose oxide would be the relatively acidic component of a thermally stable mixed oxide of the type just mentioned, and thus in preferred catalysts is one usable as the argillaceous component of hydraulic cement. It can be introduced to the coprecipitation as anions or cations or both. Very suitably this further metal is aluminium. Preferably, a further quantity of this component, conveniently a compound of the same metal, is introduced as such at some stage, preferably after the coprecipitation but before mixing in any cement. This component is preferably in an "active" (that is, not "dead-burnt") form: thus for example when alumina is used it should be hydrated or hydratable.

The oxide which would be the basic component of the thermally stable mixed oxide of the type mentioned above, and thus in preferred catalysts the calcareous component of hydraulic cement, is most conveniently calcium oxide. Suitably the total calcium oxide proportion is in the range 5–25%, especially 10–20% by weight.

Particularly in catalysts for very high temperature reactions (for example at over 1000° C.) or containing more than 10% of CaO it is preferred not to have more than 5%, if any, of magnesia. It is preferred that this component should be added not by coprecipitation but as such, that is, as a substantially water-insoluble compound such as the oxide, hydroxide, carbonate or oxalate. Alternatively, it can be added as a water-soluble compound thermally decomposable to the oxide, for example the nitrate, nitrite, acetate (or other carboxylic acid salt) or bicarbonate: in this event any undesired soluble salts in the precipitate should be washed out before the water-soluble compound is added.

Catalysts according to the invention, especially if intended for use in very high temperature reactions as mentioned in the preceding paragraph, should preferably not contain more than about 5% of silica, hence any added hydraulic cement is preferably of low silica content, as exemplified by the calcium aluminate cements "Ciment Fondu" and "Secar" (both registered trademarks) or by chrome cements. Likewise it is desirable to avoid accidental introduction of silica as an impurity in other ingredients. As in the catalysts specifically described below, the silica content is desirably less than 1%.

The proportion of refractory supply material added by coprecipitation to refractory support added as such can be varied widely, for example up to 95% by coprecipitation, but it is not usually necessary to go to the trouble and expense of adding a large proportion by coprecipitation. The preferred proportion is in the range 5 to 40%, especially 10 to 25%.

The proportion of cement components added separately to any cement components added as cement is preferably in the range 0.3 to 4.0, especially 0.5 to 1.0.

The catalytically active metal is preferably one or more from Group VI or Group VIII or both, of the Periodic Table. Most commonly nickel is used, alone or in mixtures with, e.g., tungsten or molybdenum, or with one or more precious metals of Group VIII as described in our U.K. specification 1,032,752. Other metals and metal mixtures can however be used, for example cobalt alone or in mixtures similar to those in which nickel is used, and so can the precious metals of Group VIII alone as described in our U.K. specification 1,029,235. Metals of Groups I and VII can also be used, alone or in mixtures. The proportion of the catalytically active metal depends on whether it is a base metal or a precious metal. Using base metals the proportion is for example 3 to 80% especially 5 to 50% w./w., calculated as oxide on the unreduced composition freed of volatiles by calcination at 900° C. Using precious metals alone the proportion is for example 0.01 to 5% by weight, calculated as the metal on the volatiles-free composition. Using mixtures of base and precious metals the proportion of base metal is typically the same as when used alone but the proportion of precious metal need be only 0.001 to 0.5% by weight.

In addition to the substances already mentioned the catalyst compositions made by the method of the invention can contain, as described for example in our U.K. specification 953,877, a proportion of one or more alkali metal compounds, especially 0.5% or more, for example 1 to 10% by weight (calculated as $K_2O$), for the purpose of decreasing the tendency to lay down carbon in the steam reforming process. The alkali metal compounds are in general those which are alkaline in aqueous solution or which decompose on heating below 1000° C. to give a more alkaline compound. Thus for example nitrates, nitrites, carboxylic acid salts, carbonates, bicarbonates, hydroxides and oxides are very suitable. The presence of these compounds or their decomposition products is desirable when the catalysts are to be used for reacting with steam hydrocarbon feedstocks which boil at atmospheric pressure at above about −50° C. (especially in the range 30 to 350° C. for example 30 to 220° C.) and/or which are unsaturated, and especially when these reactions are to be carried out at superatmospheric pressure. The alkali metal compound can be added at any convenient stage but is preferably added after the mixture has been shaped but before it has been reduced. If the mixture contains added cement and is to be shaped by extrusion, the alkali metal compound can be present in the mixture to be extruded.

Apparently because they contain considerable proportions of alkaline earth metal oxides or low proportions of silica, preferred catalysts according to the invention show a relatively low tendency to lay down carbon. As a result the proportion of alkali metal needed in order to make them usable in steam reforming the hydrocarbons mentioned above is less than that needed for certain known catalysts, for example 0.5–5% calculated as $K_2O$, rather than 6–9%. As a result, also catalysts according to the invention are especially useful in the multizone catalyst-bed processes described in our copending application 1692/67.

The catalysts can be shaped by any convenient method, but it is preferred to use pelleting or extrusion. The usual pelleting and extrusion aids, for example graphite, "Sterotex," water-soluble polymers and (for extrusion) cement-setting retarders can be used. The method of the invention preferably includes a calcination of the shapes at 250 to 800° C., but it appears surprisingly to be unnecessary to heat them at such a high temperature that extensive formation of the thermally stable mixed oxide takes place. This calcination can be followed by further contact with water, then a drying and/or calcination stage.

The invention provides also a process for reacting hydrocarbons with steam, carbon dioxide or oxygen or mixtures of those gases over a catalyst as herein defined or as made by the method as herein defined. Such processes are well known and are conducted at temperatures in the range 250–1000° C., steam-carbon molar ratios from about 1.3 upwards (for example to 6.0) and pressures of 1 to 50 atmospheres, the conditions employed depending on the intended use of the reaction products. For example the highest temperatures and steam ratio are appropriate for hydrogen manufacture, the lowest temperatures and steam ratios for converting liquid hydrocarbons to rich fuel gases, with intermediate levels for lean fuel gas or for ammonia and methanol synthesis gas. When making ammonia or methanol synthesis gas it is common to produce a crude synthesis gas containing methane (for example 1–10%) by the process already mentioned, especially when operated without oxygen addition as a so-called primary reforming process, and then to raise the temperature and destroy the methane by admission of air (in order also to introduce nitrogen) or oxygen. In this process, which is called secondary reforming, temperatures of 800–1200° C. are reached in order to produce the required low methane contents and still higher temperatures are often obtained locally in catalyst beds. Substantially alkali-free catalysts according to the invention or made by the process of the invention are especially satisfactory in this type of secondary reforming.

The invention is illustrated by the following examples.

EXAMPLE 1

To a stirred solution (500 l.) of nickel nitrate (20.8 kg. NiO) and aluminium nitrate nonahydrate (55 kg.) was added at 75° C. a solution of sodium carbonate (69 kg. anhydrous) in 250 litres of water. The resulting slurry contained a small concentration of unreacted sodium carbonate. To it was added a slurry of finely divided alumina monohydrate (49.6 kg.) in 450 litres of water. The suspended solids in the slurry were collected on a filter, washed well, and reslurried with calcium hydroxide (15 kg.) in 550 litres of water. This mixture was filtered and dried then calcined at 400 to 420° C., finely ground and mixed with 45% of its weight of the low silica aluminous cement sold under the registered trademark "Secar." The mixture was pelleted dry (with graphite) into rings of length and diameter 16.6 mm., wall thickness 7 mm. The rings were heated by combustion gases at 250° C. for 12 hours, soaked in water for 24 hours, then dried at 105° C.

The rings had the following percentage composition by weight: NiO, 15.4; CaO, 12.6; Al₂O₃, 50.2; SiO₂, 0.9; Na₂O, 0.15; loss at 900° C., 20.1. Their mean horizontal crushing strength when fresh was 135 lbs.; this fell to 64 lbs. after steaming and reduction (80% steam, 20% hydrogen, atmospheric pressure) at 750° C. for 24 hours, but subsequently fell only slightly (to 55 lbs.) on exposure to a methane-hydrogen-carbon monoxide steam mixture at 1100° C. At this temperature the rings underwent some deformation but very little chipping or cracking and substantially no breakage.

EXAMPLE 2

Samples of catalyst rings made by the method described in Example 1 were soaked in potassium hydroxide solution to give A, 1.2%; B, 2.0% and C, 40% by weight of $K_2O$ then dried at 120° C. and calcined at 700° C. for 6 hours. (These percentages of $K_2O$ are reckoned on the composition after this calcination which left 3–4% of volatile material removable by heating at 900° C.) The mean horizontal crushing strength of these rings was A, 84; B, 77; C, 67 lbs.

These samples were tested by passing over them a mixture of desulphurised naphtha (boiling range 30–170° C.) and steam (steam ratio 3.5) at 825° C., 450 p.s.i.g., the liquid naphtha hourly space velocity being 1.66. It was found that catalyst C effected complete conversion of the naphtha with no carbon formation, and was active enough to bring about a methane-steam reaction equilibrium corresponding to 33° C. below the outlet temperature. It was found that catalysts B and A gave rise to slow deposition of carbon, but that this did not take place if the steam ratio was increased to 4.1. Catalysts B and A were slightly if at all less active than catalyst C, the approach to methane-steam equilibrium being of the same order. Despite the very low content of silica in the catalyst, the rate of evolution of potassium compounds by volatilisation was no greater than when using a conventional nickel-kaolin-magnesia-cement-potash catalyst.

EXAMPLE 3

A series of catalysts D–G was made by the method of Example 1, but containing varying quantities of magnesia, the magnesia being added with the alumina monohydrate slurry. In these catalysts the calcium hydroxide addition was also greater than in Example 1 and corresponded to final CaO contents of 17–18%. These catalysts were shaped in the form of cylindrical pellets 5.4 x 5.4 mm. and hardened by soaking in water and calcining at 700° C. for 6 hours. Table 1 shows their percentage compositions by weight and their vertical crushing strengths before and after steaming and reduction. It is evident that greatest strength is obtained at magnesia contents below 5%.

TABLE 1

| Catalyst | D | E | F | G |
|---|---|---|---|---|
| Intended MgO, percent w./w.: | 0 | 3 | 5 | 7 |
| Composition, percent w./w.: | | | | |
| NiO | 22.6 | 22.7 | 22.1 | 19.6 |
| CaO | 17.8 | 18.2 | 17.8 | 18.4 |
| Al₂O₃ | 58.3 | 56.4 | 54.6 | 55.5 |
| SiO₂ | 0.8 | 0.6 | 0.6 | 0.9 |
| MgO | 0.45 | 2.1 | 4.9 | 5.6 |
| Vertical crushing strength before steaming and reduction: | | | | |
| Mean | 678 | 669 | 642 | 287 |
| Range | 510–800 | 540–800 | 300–800 | 220–340 |
| Vertical crushing strength after steaming and reduction: | | | | |
| Mean | 150 | 131 | N.A. | 123 |
| Range | 100–200 | 100–170 | N.A. | 100–150 |

N.A.—Not available.

EXAMPLE 4

A series of catalysts (H, J, K, L) was made by the method of Example 1, but containing less nickel oxide and calcium oxide and varying quantities of magnesia, all higher than in the catalysts of Example 3. These catalysts were shaped in the form of cylindrical pellets 5.4 x 5.4 mm. then hardened by soaking in water and calcining for 6 hours, the temperature being 700° C. for part, 1000° C. for the rest of the pellets. Table 2 shows the percentage compositions by weight and their vertical crushing strengths before steaming and reduction.

It is evident from a comparison of Example 4 with Example 3 that catalysts of adequate strength and resistance to cracking can be obtained at higher magnesia contents provided the lime content is lower.

TABLE 2

| Catalyst | H | | J | | K | | L | |
|---|---|---|---|---|---|---|---|---|
| Intended MgO percent w./w. | 10 | | 15 | | 20 | | 30 | |
| Composition, percent w./w.: | | | | | | | | |
| NiO | 12.8 | | 13.5 | | 12.8 | | 13.0 | |
| CaO | 8.6 | | 8.2 | | 8.8 | | 8.8 | |
| Al₂O₃ | 67.3 | | 62.0 | | 57.4 | | 49.7 | |
| SiO₂ | 1.55 | | 1.6 | | 1.6 | | 1.6 | |
| MgO | 9.7 | | 14.7 | | 19.4 | | 26.9 | |
| Calcination temp., °/C. | 700 | 1,000 | 700 | 1,000 | 700 | 1,000 | 700 | 1,000 |
| Vertical crushing strength, lbs.: | | | | | | | | |
| Mean | 530 | 290 | 446 | 233 | 585 | 281 | 108 | 80 |
| Range | 410–620 | 200–370 | 370–560 | 100–340 | 380–700 | 200–350 | 90–140 | 72–90 |
| Percent cracked | 0 | 0 | 27 | 40 | 36 | 50 | 40 | 50 |

EXAMPLE 5

Catalysts M, N were made by the method of Example 1 but with the difference that a higher proportion of nickel was introduced and that slightly different proportions of cement were employed, namely 40% in M and 50% in N. Each was shaped in the form of 5.4 x 5.4 mm. cylindrical pellets, then hardened by soaking in water and calcining at 700° C. for 6 hours. Their crushing strengths were as shown in Table 3.

TABLE 3

| Catalyst | M | N |
|---|---|---|
| Composition, percent w./w.: | | |
| NiO | 29.8 | 29.6 |
| CaO | 17.4 | 17.1 |
| Al₂O₃ | 51.0 | 51.8 |
| SiO₂ | 0.9 | 0.6 |
| MgO | 0.9 | 0.9 |
| Vertical crushing strength, lbs: | | |
| Mean | 577 | 750 |
| Range | 510–710 | 660–800+ |

We claim:

1. In a catalyst for the reaction of hydrocarbons with steam, carbon dioxide or oxygen or mixtures thereof which has therein a catalytically active metal for that reaction and selected from Groups VI and VIII of the Periodic Table, and a refractory metal oxide support material, the improvement wherein the catalyst comprises at least one first refractory metal oxide in a solid form of low solubility so that its physical structure is neither formed nor destroyed during the making of the catalyst and selected from the group consisting of the oxides of the alkaline earths and aluminum and at least one coprecipitated second refractory metal oxide selected from the group consisting of the oxides of aluminum and chromium and a coprecipitated catalytically active metal.

2. A catalyst according to claim 1 in which the second refractory metal oxide is in the range 5–40% by weight.

3. A catalyst according to claim 1 in which the first and second refractory metal oxides comprise a combination of oxides usable as the constituents of a hydraulic cement.

4. A catalyst according to claim 3 wherein in addition to the said combination of oxides usable as the constituents of a hydraulic cement a hydraulic cement is added and the proportion of said combination of oxides to said hydraulic cement is in the range 0.5 to 1.0.

5. A catalyst according to claim 3 in which the said second refractory metal oxide is usable as the argillaceous component of a hydraulic cement.

6. A catalyst according to claim 3 in which a further quantity of the said first refractory metal oxide is added to the combination of the said first refractory metal oxide and coprecipitated second metal oxide and coprecipitated catalytically active metal.

7. A catalyst according to claim 5 in which the first refractory metal oxide is usable as calcareous component of a hydraulic cement and is added as a substantially water-insoluble compound.

8. A catalyst according to claim 1 in which the catalyst contains one or more alkali metal compounds to the extent in all of at least 0.5% by weight calculated as $K_2O$ for the purpose of decreasing the tendency to lay down carbon in the steam reforming process.

9. A method of making a catalyst or composition according to claim 1 which comprises precipitating together a compound of a catalytically active metal for the said reaction and a compound of at least one metal selected from the group consisting of aluminum and chromium, adding before, during or after the coprecipitation a quantity of a substantially water-insoluble compound of a metal selected from the group consisting of the alkaline earths and aluminum, removing any undesired soluble substances from the resulting mixture and shaping the mixture.

10. The catalysts of claim 1 where a hydraulic cement is contained in the catalysts.

11. The process of claim 9 where a hydraulic cement is contained in the catalysts.

12. The catalysts of claim 1 wherein the catalyst, suitable for use in high-temperature steam reforming at temperatures of between 800–1200° C., comprises 5–50% coprecipitated nickel calculated as NiO and alumina, the alumina being partly solid alumina and partly coprecipitated alumina, the coprecipitated alumina to solid alumina being in the range 5–40%.

13. The catalyst of claim 12 in which calcium oxide, alumina and a hydraulic cement are present, the proportion of calcium oxide and alumina added separately to calcium oxide and alumina added as cement being in the range 0.5 to 1.

14. The catalyst of claim 13 containing more than 10% of CaO and less than 5% of MgO.

References Cited

UNITED STATES PATENTS

| | | | |
|---|---|---|---|
| 3,186,797 | 6/1965 | Pearce et al. | 252—457 X |
| 3,256,207 | 6/1966 | Arnold | 252—457 X |
| 3,320,182 | 5/1967 | Taylor et al. | 252—466 |
| 3,351,566 | 11/1967 | Taylor et al. | 252—452 |

DANIEL E. WYMAN, Primary Examiner

C. F. DEES, Assistant Examiner

U.S. Cl. X.R.

252—457, 458, 459, 465, 466; 48—214